Jan. 20, 1970     A. F. YATES ET AL     3,490,296

AUTOMATIC POSITION SEEKING DEVICE

Filed Feb. 9, 1968

INVENTORS
ALAN F. YATES
LEONARD L. GAUBIS

BY *Lawrence A. Savage*

AGENT

United States Patent Office 3,490,296
Patented Jan. 20, 1970

3,490,296
AUTOMATIC POSITION SEEKING DEVICE
Alan F. Yates, Simsbury, Conn., and Leonard L. Gaubis, Hagerstown, Md., assignors to United Aircraft Corporation, East Hartford, Conn., a corporation of Delaware
Filed Feb. 9, 1968, Ser. No. 704,447
Int. Cl. F16h 35/00
U.S. Cl. 74—2                                6 Claims

ABSTRACT OF THE DISCLOSURE

An automatic position seeking device is provided by the combination of rotatably mounted cylinder means receiving an input signal via linkage means which rotate the cylinder means to a desired position, a piston disposed within the cylinder means for translational movement therein, means urging the piston in one direction, stop means normally preventing translation of the piston when the linkage means are intact, cam means disposed in the housing of the cylinder means so that as the piston translates in response to the failure of the linkage means, the piston, having a cam follower disposed thereon, rotates the cylinder means, and means disposed on the cylinder means for generating a signal indicative of the rotational position of the cylinder means.

BACKGROUND OF THE INVENTION

Field of the invention

This invention relates to automatic position seeking devices and particularly to a device receiving an input signal from a linkage system, which device will automatically seek a predetermined position upon the failure of the linkage system.

SUMMARY OF THE INVENTION

One object of the present invention is to provide a device which seeks a predetermined position in response to failure of the linkage utilized to actuate the device.

Another more specific object of the present invention is to provide a pitch changing signal for an aircraft propeller in response to the failure of the linkage connecting the pilot's control lever with the propeller pitch changing mechanism such that the signal generator will seek a predetermined position which will send a signal to the pitch changing means to select a blade angle resulting in zero thrust.

In accordance with the present invention an automatic position seeking device is provided by the combination of rotatably mounted cylinder means receiving an input signal via linkage means which rotate the cylinder means to a desired position, a piston disposed within the cylinder means for translational movement therein, means urging the piston in one direction, stop means normally preventing translation of the piston when the linkage means are intact, cam means disposed in the housing of the cylinder means so that as the piston translates in response to the failure of the linkage means, the piston, having a cam follower disposed thereon, rotates the cylinder means, and means disposed on the cylinder means for generating a signal indicative of the rotational position of the cylinder means.

The foregoing and other objects, features and advantages of the present invention will become more apparent in light of the following detailed description of a preferred embodiment thereof as illustrated in the accompanying drawings.

DESCRIPTION OF THE PREFERRED EMBODIMENT

Figure 1:
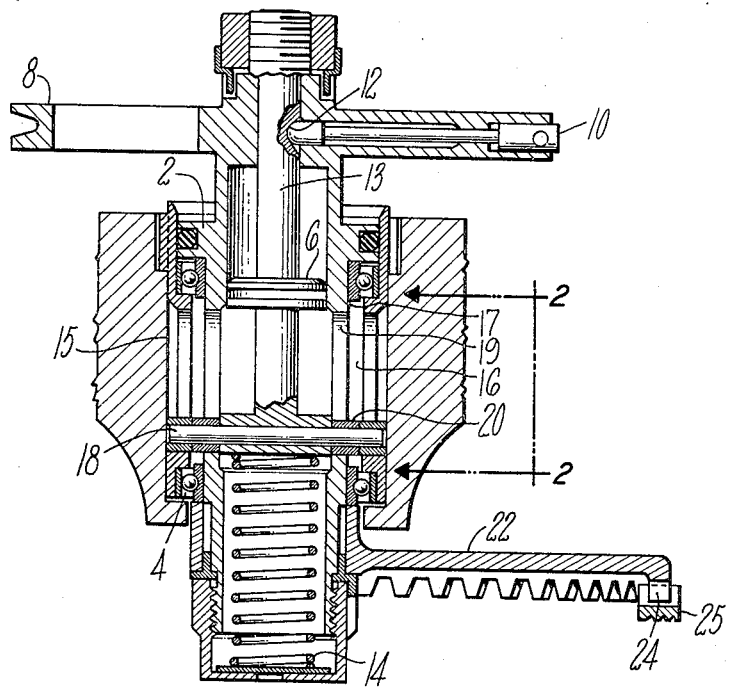
FIG. 1 is a sectioned elevation of the automatic position seeking device in accord with the present invention.
Figure 2:
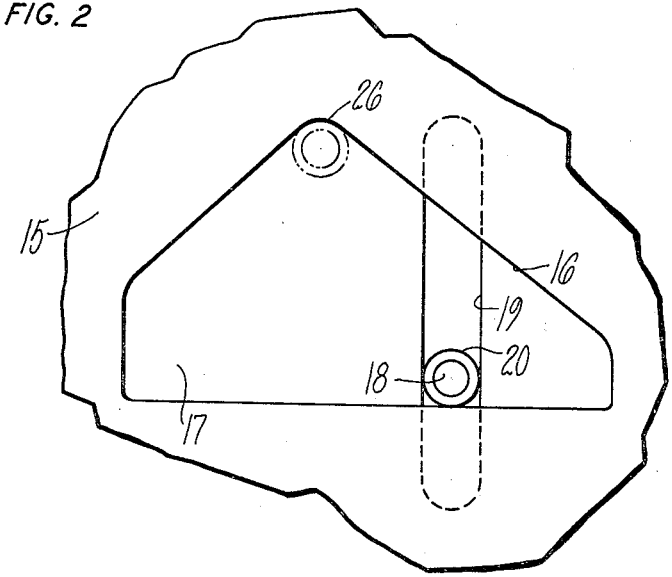
FIG. 2 is a view taken along line 2—2 of FIG. 1 showing the cam means and the cam follower disposed on the piston.

Referring now to FIG. 1, there is shown cylinder means 2 rotatably mounted in bearings 4. Piston 6 is disposed in cylinder means 2 for translational motion therein. Linkage means, for example, a pulley 8 and cable (not shown), is provided for normally rotating cylinder means 2. Pin 10 is disposed radially in the pulley 8 and normally engages the detent 12 in piston rod 13. The pin 10 is normally prevented from disengaging the detent 12 by the force of the cable wrapped around the pulley 8. Means for urging the piston to move, for example, a spring 14, urges the piston 6 to move upwards as shown on the drawing. Stationary housing 15 surrounds cylinder means 2 and prevents axial motion thereof. Cam profile 16 is cut in the wall of housing 15, and a slot 19 is cut in the wall of cylinder means 2. A shaft 18 disposed in piston 6 transverse to the axis of the cylinder has roller bearings 20 which engage the cam profile 16 in housing 15 and the slot 16 in cylinder means 2 as shown best in FIG. 2. Signal generating means 22 in the form of an arm carrying a gear segment 24 thereon, is shown disposed on cylinder means 2 for rotation therewith.

The operation of this embodiment of our automatic position seeking device will be described as a component in the pitch change mechanism for a propeller blade although its use is certainly not limited thereto. The purpose of the device in this mechanism is to position the propeller blades (not shown) at a predetermined blade angle in the event of a failure in the linkage from the pilot's control lever to the propeller control. Pulley 8 is driven by a cable (not shown). When the cable surrounds the pulley in the normal manner, it forces the pin 10 to engage detent 12 in the piston rod 13, locking the piston from translating upwardly within cylinder means 2. Rotation of the pulley 8 by the cable connected to the pilot's control lever (not shown) rotates cylinder means 2 in bearings 4, which, in turn, rotates arm 22 carrying gear segment 24 at the end thereof. This signal is applied to the pitch change motor (not shown) of the propeller blades, via gear 25, for changing the pitch of the blades. Roller bearings 20 mounted on shaft 18 disposed in piston 6 fit into cam profile 16 formed in the wall of housing 15 and the slot 19 in cylinder means 2. In the event that the cable breaks, the force created by the spring 14 on piston 6 causes the piston to move upwardly. Since the cable is broken, pin 10 is no longer held in engagement with detent 12 and the force of the piston 6 moving upwards will displace the pin 10 so that it no longer locks the piston 6 or prevents the movement thereof. Roller bearings 20 then engage cam profile 16 forcing cylinder means 2 rotate until roller bearings 20 reach the apex 26 of the cam profile 16 (as shown in dotted lines in FIG. 2). The rotation of cylinder means 2, obviously, rotates arm 22 and gear 24, thereby imparting a signal to the pitch change motor via gear 25 to effectuate pitch changing movement. Hence, it is apparent that the position of the roller bearings 20 in the apex 26 of cam profile 16 determines a certain propeller blade angle and whenever it is in that position, the blade will be at a predetermined angle.

There has thus been described a preferred embodiment of an automatic position seeking device in accordance with the present invention. While a propeller blade pitch changing mechanism has been shown as the environment in which our invention has utility, it will be obvious to anyone skilled in the art that it has utility anywhere it is desired that a mechanism go to a certain position upon failure of the control linkage. Furthermore, while the linkage used in the description of the preferred embodiment is a pulley and cable arrangement, our invention is not restricted to that type of linkage. Therefore, it should be understood by those skilled in the art that various changes and omissions in the form and detail thereof may be made therein without departing from the spirit and scope of the invention.

What we claim as new and desire to secure by Letters Patent of the United States is:

1. An automatic position seeking device, comprising:
   rotatably mounted cylinder means disposed in a housing, said cylinder means having an opening therein through which cam follower means may pass;
   linkage means connected to said cylinder means for rotating said cylinder means in response to movement of said linkage means;
   a piston disposed within said cylinder means for translational movement therein;
   urging means for urging said piston to translate within said cylinder means;
   stop means normally preventing said piston from translating when said linkage means are intact;
   cam means disposed in said housing; and
   cam follower means disposed on said piston and passing through said opening so that as the piston moves in response to the urging of said urging means upon a failure of said linkage means, said cam follower means will move with said piston and cooperate with said cam means to rotate said cylinder means to a predetermine position selected by said cam means.

2. An automatic position seeking device as recited in claim 1, further comprising signal generating means disposed on said cylinder means for generating a signal indicative of the rotational position of said cylinder means.

3. An automatic position seeking device as recited in claim 1, wherein said linkage means comprises:
   a pulley disposed on said rotatably mounted cylinder means;
   cable means disposed around said pulley and connected to control input means whereby the cable moves in response to the movement of said control input means, thereby rotating said cylinder means.

4. An automatic position seeking device as recited in claim 1, wherein said stop means comprises:
   a detent in the rod of said piston;
   a pin disposed in said linkage means normally caused to engaged said detent by said linkage means to prevent said piston from translating, said pin moving out of engagement with said detent in response to a failure of said linkage means, thereby permitting said urging means to translate said piston, and thereby to rotate said cylinder means to a predetermined position.

5. An automatic position seeking device as recited in claim 3, wherein said stop means comprises:
   a detent in the rod of said piston;
   a pin disposed radially in said pulley and normally caused to engage said detent by the cable bearing against said pin; said pin moving out of engagement with said detent upon failure of said cable, thereby permitting said urging means to translate said piston, and thereby rotating said cylinder means to a predetermined position.

6. An automatic position seeking device as recited in claim 1, wherein said cam means and said cam follower means comprise:
   a cam profile cut in the wall of said housing;
   a shaft disposed in said piston in a direction transverse to the axis of said cylinder means and engaging the cam profile in the wall of said housing and also passing through said opening in said cylinder means, said opening comprising a slot cut in said cylinder means so that as the piston translates in response to a failure of said linkage means, said shaft will cause said cylinder means to rotate until said shaft reaches a stop in said cam profile.

References Cited

UNITED STATES PATENTS 3,391,722   7/1968   Ligh _____ 74—89 X

MILTON KAUFMAN, Primary Examiner

U.S. Cl. X.R.

74—89